US011775656B2

(12) United States Patent
Kafai et al.

(10) Patent No.: US 11,775,656 B2
(45) Date of Patent: Oct. 3, 2023

(54) SECURE MULTI-PARTY INFORMATION RETRIEVAL

(71) Applicant: ENTIT Software LLC, Sunnyvale, CA (US)

(72) Inventors: Mehran Kafai, Palo Alto, CA (US); Hongwei Shang, Palo Alto, CA (US); April Slayden Mitchell, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 1475 days.

(21) Appl. No.: 15/567,531

(22) PCT Filed: May 1, 2015

(86) PCT No.: PCT/US2015/028896
§ 371 (c)(1),
(2) Date: Oct. 18, 2017

(87) PCT Pub. No.: WO2016/178655
PCT Pub. Date: Nov. 10, 2016

(65) Prior Publication Data
US 2018/0114028 A1    Apr. 26, 2018

(51) Int. Cl.
*G06F 21/60* (2013.01)
*H04L 9/32* (2006.01)
(Continued)

(52) U.S. Cl.
CPC ...... *G06F 21/602* (2013.01); *G06F 16/24578* (2019.01); *G06F 21/6227* (2013.01);
(Continued)

(58) Field of Classification Search
None
See application file for complete search history.

(56) References Cited

U.S. PATENT DOCUMENTS 5,647,058 A * 7/1997 Agrawal .............. G06K 9/6232
6,374,266 B1    4/2002 Shnelvar
(Continued)

FOREIGN PATENT DOCUMENTS

EP    2650798    10/2013

OTHER PUBLICATIONS

Shang, Z., Oya, S., Peter, A. and Kerschbaum, F., 2021. Obfuscated access and search patterns in searchable encryption. arXiv preprint arXiv: 2102.09651. (Year: 2021).*

(Continued)

*Primary Examiner* — Luu T Pham
*Assistant Examiner* — Edward X Long
(74) *Attorney, Agent, or Firm* — Sheridan Ross P.C.

(57) ABSTRACT

Secure multi-party information retrieval is disclosed. One example is a system including a query processor to request secure retrieval of candidate terms similar to a query term. A collection of information processors, where a given information processor receives the request and generates a random permutation. A plurality of data processors, where a given data processor generates clusters of a plurality of terms in a given dataset, where the clusters are based on similarity scores for pairs of terms, and selects a representative term from each cluster. The given information processor determines similarity scores between a secured query term received from the query processor and secured representative terms received from the given data processor, where the secured terms are based on the permutation, and the given data processor filters, without knowledge of the query term, the candidate terms of the plurality of terms based on the determined similarity scores.

20 Claims, 3 Drawing Sheets

(51) Int. Cl.
G06F 16/2457 (2019.01)
G06F 21/62 (2013.01)

(52) U.S. Cl.
CPC ........ G06F 21/6254 (2013.01); H04L 9/3239 (2013.01); *G06F 2221/2115* (2013.01); *H04L 2209/46* (2013.01)

(56) References Cited

U.S. PATENT DOCUMENTS

| | | | |
|---|---|---|---|
| 6,931,408 | B2 | 8/2005 | Adams et al. |
| 7,685,083 | B2 | 3/2010 | Fairweather |
| 7,725,444 | B2 | 5/2010 | Devarakonda et al. |
| 8,010,782 | B2 | 8/2011 | Kerschbaum et al. |
| 8,041,706 | B2 | 10/2011 | Agrawal et al. |
| 8,103,824 | B2 | 1/2012 | Follack et al. |
| 8,234,470 | B2 | 7/2012 | Tevis et al. |
| 8,630,422 | B2 | 1/2014 | Gentry et al. |
| 8,805,793 | B2 | 8/2014 | Patiejunas et al. |
| 2007/0038602 | A1 | 2/2007 | Weyand et al. |
| 2008/0177810 | A1 | 7/2008 | Devarakonda et al. |
| 2010/0146299 | A1* | 6/2010 | Swaminathan ..... G06F 21/6218 713/189 |
| 2011/0145593 | A1 | 6/2011 | Auradkar et al. |
| 2011/0196855 | A1* | 8/2011 | Wable ............... G06F 16/24554 707/711 |
| 2012/0137375 | A1 | 5/2012 | Ramachandran et al. |
| 2013/0007864 | A1 | 4/2013 | Herz et al. |
| 2013/0173917 | A1 | 7/2013 | Clifton et al. |
| 2013/0191329 | A1 | 7/2013 | Dozier et al. |
| 2013/0275752 | A1 | 10/2013 | Zhang et al. |
| 2014/0173687 | A1* | 6/2014 | Dimitrakos ......... G06F 21/6245 726/1 |
| 2014/0176987 | A1* | 6/2014 | Sakagami ............ H04N 1/4433 358/1.14 |
| 2014/0281578 | A1 | 9/2014 | Bennison |
| 2015/0019530 | A1* | 1/2015 | Felch .................. G06F 16/3326 707/719 |
| 2015/0039292 | A1* | 2/2015 | Suleman ............... G06F 16/285 704/9 |
| 2015/0154418 | A1 | 6/2015 | Redberg |
| 2015/0379121 | A1* | 12/2015 | Akolkar ............. G06Q 30/0625 707/723 |

OTHER PUBLICATIONS

Cui, A., Li, M., Qu, G. and Li, H., 2020. A guaranteed secure scan design based on test data obfuscation by cryptographic hash. IEEE Transactions on Computer-Aided Design of Integrated Circuits and Systems, 39(12), pp. 4524-4536. (Year: 2020).*

"DBA Society"; May 22, 2016; 29 pages.

Alaggan, M.; "Private Peer-to-peer Similarity Computation in Personalized Collaborative Platforms"; dated: May 1-9, 2014; http://tel.archives-ouvertes.fr/docs/00/98/91/64/PDF/ALAGGAN_Mohammad.pdf.

Aschermann, Malte et al., "Similarity-Based Resource Retrieval in Multi-agent Systems by Using Locality-Sensitive Hash Functions," In: Mul t i agent System Technologies, pp. 4-18, 2013 See abstract; section 3; and figure 2.

Damgard, I. et al.; "On the Orthogonal Vector Problem and the Feasibility of Unconditionally Secure Leakage Resilient Computation"; dated: Apr. 23, 2014; https://eprint.iacr.org/2014/282 pdf.

Huang, Y., "Practical Secure Two-party Computation"; dated: Aug. 2012; http://yhuangpress.flies.wordpress.com/2014/02/dissertation.pdf.

Jiang, Wei et al., "A Secure and Distributed Framework to Identify and Share Needed Information," In: IEEE International Conference on Privacy; Security, Risk and Trust (PASSAT) and Social Computing (Soc i a l Com), pp. 1224-1230, Oct. 9-11, 2011 See abstract and section III.

Kraschewski, D.: "Complete Primitives for Information-theoretically Secure Two-party Computation"; dated: Jan. 25, 2013; https://ww.google.co.in/url?sa=t&rct=j&q=&esrc=s&source=web&cd=1&ved=0CCIQFjAA&url=http%3A%2F%2Fdigbib.ubka.uni-karlsruhe.de%2Fvolltexte%2Fdocuments%2F2613501&ei=52y6USDnLse0uATC-oHIDw&usg=AFQjCNHN4oC-wKUOFpnhZ9w3AScSDm2Gog&sig2=pz4XmiCGKSVVT4fdZjS7fQ&bvm=bv.70138588,d.c2E.

Liu, C. et al.;"Automating Efficient RAM-Model Secure Computation"; dated: Mar. 15, 2014:http://www.cs.umd.edu/~mwh/papers/ram-sc pdf.

Nair, Divya G et al., "An Effective Private Date storage and Retrieval system using Secret sharing scheme based on Secure Multi-party Computation," In: International Canference on Data Science & Engineering (ICDSE), pp. 210-221, Aug. 26-28, 2014; See abstract; section III; and figures 1-2.

Oracle; "Flexible Data Streams"; 2005; Oracle Demand Planning Implementation and User's Guide; 16 pages.

PCT: "Notification of Transmittal of the International Search Report and the Written Opinion of the International Searching Authority, or the Declaration"; cited in PCT/US2014/053333; dated Apr. 29, 2016; 11 pages.

Preneel, B.; "Analysis and Design of Cryptographic Hash Functions"; dated: Feb. 2003: http://www.cosic.esat.kuleuven.be/publications/thesis-2.pdf.

Wiese, Lena, "Horizontal Fragmentation for Date Outsourcing with Formula-Based Confidentiality Constraints," In: Advances in Information and Computer Security, pp. 101-116, 2010 See abstract and section 4.

* cited by examiner

SECURE MULTI-PARTY INFORMATION RETRIEVAL

BACKGROUND

Secure multi-party information retrieval is a secure protocol that allows one party to retrieve information from a plurality of second parties without revealing the data that supports the information.

DETAILED DESCRIPTION

Figure 1:
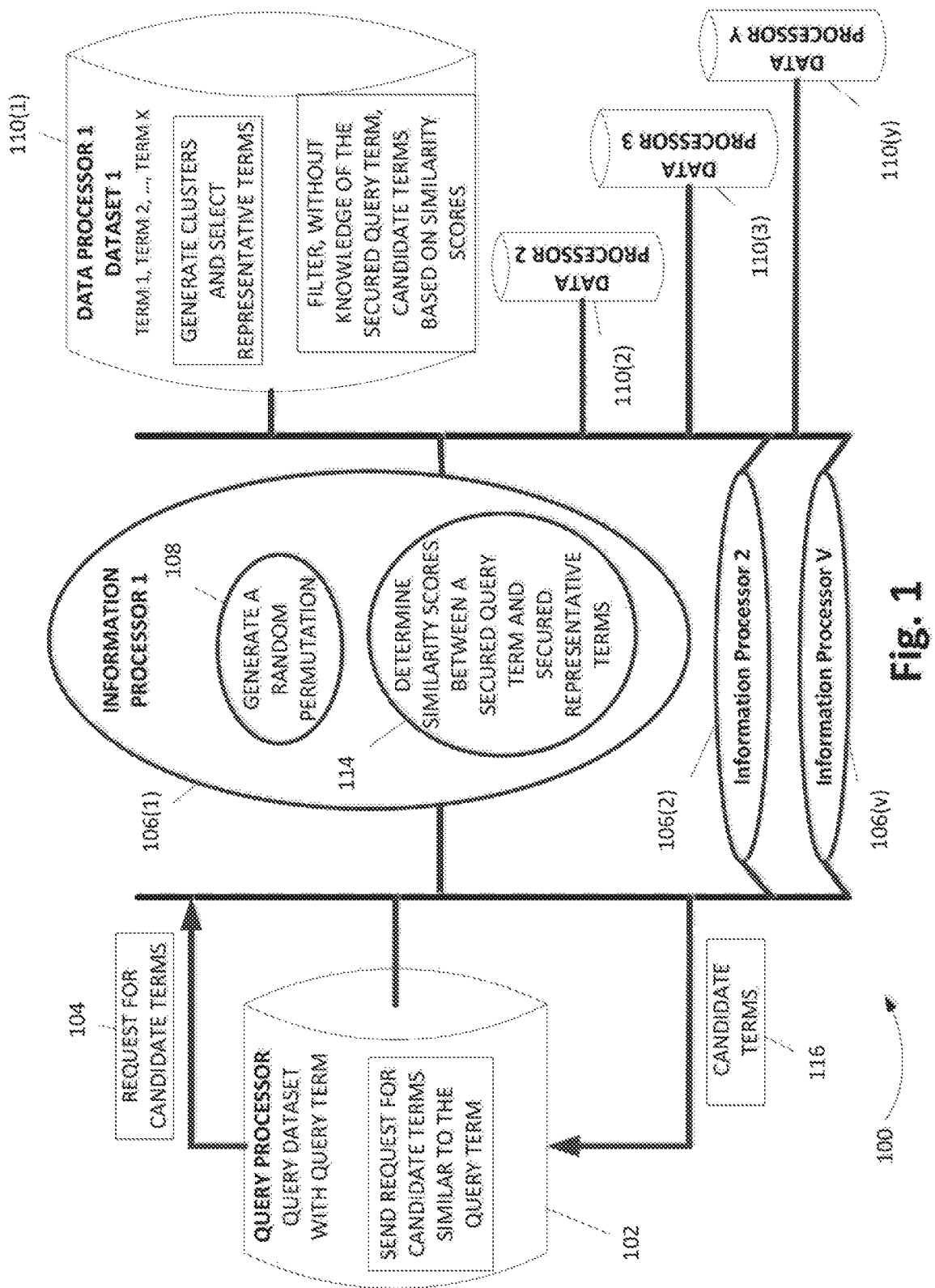
FIG. 1 is a functional block diagram illustrating one example of a system for secure multi-party information retrieval.

The need for computations on sensitive data from two or more individuals has grown in recent years. This problem is known as secure multi-party computation ("SMPC"). Closely related problems include secure multi-party comparison, secure two-party vector dominance, and private information retrieval (PIR). For example, the socialist millionaire problem is illustrative of an information retrieval problem. Two millionaires may want to know if they are equally wealthy without leaking any information about their respective wealth. Several algorithms, frameworks, and theoretical solutions have been proposed to help solve the information retrieval problem. One major issue with the theoretical solutions is related to their impracticality due to high computational complexity. Existing protocols are typically unable to perform efficient search over large sets of anonymized and/or encrypted data without information leakage.

In some instances, a first party may desire to securely retrieve information from a plurality of second parties. For example, the first party may desire to securely retrieve a ranked list of the most similar objects from multiple parties compared to an object from the first party. Based on a volume of data, such situations may result in an increase in a number of secure computations and inter-party data exchanges. Also, for example, there may be intermediate information processors that may not be secure, and/or may have unreliable data protection mechanisms. In such instances, there is a need to not expose all the data from one or more of the parties. Accordingly, there is a need to compute similarity between data distributed over multiple parties, without exposing all the data from any party, and without a need for secure intermediaries. Secure multi-party retrieval ("SMPR") addresses such situations.

For example, a group of hospitals may have a group of patients with certain symptoms/results. The group of hospitals may want to know if another hospital has patients with similar symptoms/results in order to identify cohorts. If cohorts are identified, the first and second hospitals may then consider next steps for comparing recommended treatment options. Based on SMPR, such a comparison is possible without any of the hospitals exposing their protected patient data such as test results, individual characteristics, and so forth. By hashing on a subset of the data, it is possible to identify a set of common patients, and then the hospitals that care for such patients. A novel candidate selection and filtering process may therefore eliminate a need to communicate the entire (hashed) data corpus for each party. Therefore, multiple parties with large datasets may participate in the multi-party retrieval process. This may include filtering out irrelevant hashed objects in a distributed retrieval system to reduce a search space and inter-processor communications. The intermediate information processors may only receive hashes of a portion of objects from each party. Through the proposed framework, only a subset of the objects from each party that contain the most similar objects may be shared with intermediate information processors.

As described in various examples herein, a method based on utilizing orthogonal transform based hashes is disclosed to compare entity objects in an anonymized manner. For example, the information retrieval problem may constitute determining the k objects in a plurality of second entities that are most similar to an object in the first entity, without revealing the identity of the k objects.

As described in various examples herein, a secure distributed framework is disclosed for computing the similarity between objects from different entities in an anonymous manner by utilizing multiple intermediate information processors. A hypergeometric distribution may be utilized to model similarity scores between objects defined by their respective overlapping hash sets. For example, hash-based similarity with the hypergeometric distribution may be modeled based on multiple random permutations of a hash universe, generated by different information processors, to achieve secure and anonymous computation of similarity scores. Given that the result may be shaped as a distance/similarity map between multiple parties, SMPR may be applied to perform secure distributed classification, re-identification, verification, recognition, and privacy preserving data mining. The examples described herein provide the ability to perform cost-effective retrieval in addition to anonymizing the data. No single information processor among the multiple information processors may be trusted. Also, for example, no information processor may have the ability to de-anonymize data to recreate the data retrieved.

In secure two-party retrieval ("S2PR"), two parties A and B are able to perform retrieval in a secure manner. As part of such an approach, B sends hashes from all its objects to the information processors. However, such an approach may not scale to multiple parties both in terms of network communication, and computation on the information processors. In the approach for SMPR, only a subset of the hashed objects are sent to the Information Processors, hence, making the approach scalable and practical for multi-party scenarios. If a party has a small dataset, it may follow S2PR rather than SMPR and avoid the extra processing. The two frameworks are therefore compatible; thus, they may work together in a retrieval system.

As described in various examples herein, secure multi-party information retrieval is disclosed. One example is a system including a query processor to request secure retrieval of candidate terms similar to a query term in a query dataset. A collection of information processors, where a given information processor receives the request and generates a random permutation based on the request. A plurality of data processors, where a given data processor generates clusters of a plurality of terms in a given dataset associated with the given data processor, where the clusters are based on similarity scores for pairs of terms, and the given data processor selects a representative term from each cluster. The given information processor determines similarity scores between a secured query term received from the query processor and secured representative terms received from the given data processor, where the secured terms are based on the random permutation. The given data processor filters, without knowledge of the query term, the candidate terms of the plurality of terms based on the determined similarity scores.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for system for secure multi-party information retrieval. System 100 is shown to include a query processor 102, a collection of information processors (e.g., Information Processor 1 106(1), Information Processor 2 106(2), . . . , Information Processor V 106(v)), and a plurality of data processors (e.g., Data Processor 1 110(1), Data Processor 2 110(2), . . . , Data Processor Y 110(y)). The query processor 102, the collection of information processors, Information Processor 1 106(1), Information Processor 2 106(2), . . . , Information Processor V 106(v), and the plurality of data processors, Data Processor 1 110(1), Data Processor 2 110(2), . . . , Data Processor Y 110(y)), are communicatively linked to one another via a network.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network. In some examples, the network may be a secured network.

The query processor 102 requests secure retrieval of candidate terms similar to a query term in a query dataset. In some examples, the request 104 may include a hash universe size, a hash count, and a number of terms to be retrieved. In some examples, the query term may be an N-dimensional vector with numerical, real-valued components. For example, a first party A and a plurality of second parties $B_1, B_2, \ldots, B_Y$ may each own a set of N-dimensional objects (real valued vectors). For simplicity and without loss of generality, B may represent any single party from $B_1, B_2, \ldots, B_Y$. The goal of the secure multi-party retrieval process, which is initiated by A, is to find top-k most similar objects from the collection of objects from all B's, compared to a single query object a from A, without sharing the data that each party holds, thereby minimizing information leakage. The query processor 102 sends a request 104 to initiate the retrieval process to each information processor. The request includes three parameters, U (hash universe size), H (hash count indicative of a number of hashes per object), and k (number of most similar objects that A is interested in).

For example, the query processor 102 may be interested in information related to k terms in the plurality of data processors that are most similar to the query term. The collection of information processors, comprising Information Processor 1 106(1), Information Processor 2 106(2), . . . , Information Processor V 106(v), provides secure multi-party information retrieval from the plurality of data processors to the query processor 102. System 100 includes the collection of information processors (e.g., Information Processor 1 106(1), Information Processor 2 106(2), . . . , Information Processor V 106(v)), a given information processor, say Information Processor 1 106(1), to receive the request 104 and generate a random permutation 108 of integers in the hash universe $\{1, 2, \ldots, U\}$. Each processor generates a random permutation 108 and sends the permutation to the query processor 102 and a plurality of data processors (e.g., Data Processor 1 110(1), Data Processor 2 110(2), . . . , Data Processor Y 110(y)). Each of the plurality of data processors also receives the parameters H and k.

System 100 includes the plurality of data processors (e.g., Data Processor 1 110(1), Data Processor 2 110(2), . . . , Data Processor Y 110(y)), where a given data processor is to generate clusters 112 of a plurality of terms in a given dataset associated with a respective Data Processor, the clusters being based on similarity scores for pairs of terms, and the Data Processor is to further select a representative term from each cluster. For example, Data Processor 1 110(1) may be associated with a Dataset 1 including a plurality of terms (e.g., term 1, term 2, . . . , term X). The similarity score between two vectors with the same length may be defined as a ratio of a number of shared elements to the vectors' length, which is denoted by ζ.

In some examples, a similarity map $\Omega_B$ (not shown in FIG. 1) may be determined for a dataset B (e.g., Dataset 1 associated with Data Processor 1 110(1)). Let $\zeta_{i,j}$ denote a similarity score between two terms $b_i$ and $b_j$ of dataset B, where $1 \leq i, j \leq X$. Then, the similarity scores between all pairs of terms of B may be denoted by a matrix $\Omega_B = (\zeta_{i,j})_{1 \leq i, j \leq X}$.

Next, dataset B may be partitioned into G clusters based on $\Omega_B$. In some examples, a partitioning around k-medoids ("PAM") algorithm may be utilized to obtain G representative terms from the G clusters, the representative terms denoted as $r_1, r_2, \ldots, r_G$, where $1 \leq G \leq X$. In some examples, PAM receives a dissimilarity matrix as an input. For example, the dissimilarity matrix may be $\psi_B = (\lambda_{i,j})_{1 \leq i,j \leq X}$, $\lambda_{i,j} = 1 - \zeta_{i,j}$. In some examples, G may be chosen based on heuristics, for example, G=2V.

In some examples, the given information processor, say Information Processor 1 106(1), may determine similarity scores 114 between a secured query term received from the query processor 102 and secured representative terms received from the given data processor, Data Processor 1 110(1), the secured terms based on the generated random permutation 108. In some examples, each processor generates a permutation of the integers in the hash universe $\{1, 2, \ldots, U\}$. For example, Information Processor 1 106(1) may generate a permutation $P_1$, Information Processor 2 106(2) may generate a permutation $P_2$, and so forth. The collection of permutations may be provided to the query processor 102 and the plurality of Data Processors 110(1), 110(2), . . . , 110(Y).

In some examples, as described herein, for each given information processor, say Information Processor 1 106(1), of the collection of information processors (e.g., Information Processor 1 106(1). Information Processor 2 106(2), . . . , Information Processor V 106(v)), the query term and the plurality of terms may be transformed based on a given permutation of a collection of permutations. For example, the transformation may comprise an extension of a numerical vector by concatenating it with itself to generate a vector of length U. In some examples, permutation $P_1$ may be utilized to generate a transformed query term. For example, the query term (e.g. a numerical vector) may be extended, and permutation P, may be applied to the extended vector, and then an orthogonal transform, such as WHT, may be applied to generate a transformed query term. Accordingly, based on permutations $P_1, P_2, \ldots, P_V$, V transformed query terms may be generated, each a vector of length H. Likewise, each term of the plurality of terms (e.g. numerical vectors), may be extended, and the permutation $P_1$ may be applied to the extended vectors, and then an orthogonal transform, such as Walsh-Hadamard transform ("WHT"), may be applied to generate a plurality of transformed terms. Accordingly, based on permutations $P_1, P_2, \ldots, P_V$, for each term, V transformed terms may be generated, each a vector of length H. Accordingly, for the term 1, V transformed terms are generated: for the term 2, V transformed terms are generated, and so forth, thereby generating X*V transformed terms corresponding to the X terms in the given data processor, Data Processor 1 110(1).

In some examples, the V transformed query terms may be distributed randomly to the V processors, and for each term, the V transformed terms may be distributed randomly to the V processors.

In some examples, secured terms may be generated by applying an orthogonal transform to each term of the plurality of terms in a given dataset, Data Processor 1 110(1), and by truncating a portion of the transformed term, the truncated portion based on the given information processor, and wherein the similarity scores are based on the secured terms.

For example, a hash transform may be applied to transform the query term and the plurality of terms. For example, the transformation of the query term and the plurality of terms may be based on hash count H. In some examples, the integer H may be experimentally determined based on the type and number of data terms in the query dataset. In some examples, the hash transform may be an orthogonal transformation. In some examples, the hash transform may be a Walsh-Hadamard transformation ("WHT"). In some examples, hash transform may be a Walsh-Hadamard transform applied to the query term and the plurality of terms to provide coefficients of the Walsh-Hadamard transform. In some examples, the largest H coefficients (based on the hash count) of the Walsh-Hadamard transform may comprise the transformed query term and the plurality of transformed data terms.

As described herein, in some examples, system 100 may be provided with values for hash count H and hash universe size U. Generally, U is a very large integer relative to H and N. In some examples, U is a power of 2. In some examples, hash transformer 112 may extend a numerical vector (e.g., the query term, the plurality of terms) by concatenating it with itself d times, where d may be selected as a floor (U/N). In some examples, the extension may include adding zeros so that the modified vector has U components. In some examples, H may be 100. N may be 6000, and U may be $2^{18}$. Accordingly, d=floor($2^{18}$/6000). In some examples, each 6000-dimensional vector (N=6000) may be associated with 100 integers (H=100) selected from the set $\{1, 2, 3, \ldots, 2^{18}\}$ (U=$2^{18}$). Accordingly, the hash transform may transform a higher dimensional data term (e.g. with 6000 dimensions) into a lower dimensional transformed data term (e.g. with 100 dimensions).

In some examples, for a given information processor, say Information Processor 1 106(1), of the collection of information processors (e.g., Information Processor 1 106(1), Information Processor 2 106(2), ..., Information Processor V 106(v)), the transformed query term and the plurality of transformed terms may be secured based on the given information processor, where the secured terms are generated by applying an orthogonal transform to each term, and by truncating a portion of the transformed term, the truncated portion being based on the given information processor. For example, the transformed query term may be secured to generate V secured query terms, one for each processor in the collection of information processors (e.g., Information Processor 1 106(1), Information Processor 2 106(2), ..., Information Processor V 106(v)). Likewise, each of the plurality of transformed terms may be secured to generate X*V plurality of secured terms, one for each processor in the collection of information processors (e.g., Information Processor 1 106(1), Information Processor 2 106(2), ..., Information Processor V 106(v)).

In some examples, the query term and each of the plurality of terms may be a vector with length equal to the hash count H, and the secured query term and each of the plurality of secured terms may be a sub-vector of the respective vector. For example, if the transformed query term is represented as a vector a and a transformed term of the plurality of transformed terms is represented as a vector b, each having length H, then the vectors a and b may be partitioned into V sub-vectors with each sub-vector having length H/V, where H is assumed to be divisible by V for simplicity. Accordingly, transformed vectors a and b may be represented with V components as follows:

$$a=(a_1,a_2,\ldots,a_V), b=(b_1,b_2,\ldots,b_V) \quad \text{(Eqn. 1)}$$

For each Information Processor i, $1 \leq i \leq V$, information may be extracted from (V−1) sub-vectors and one sub-vector may be deleted from both a and b. For example, for Information Processor 1 106(1), the first component of vectors a and b may be deleted to provide secured vectors $\tilde{a}_1$, $\tilde{b}_1$, respectively, where:

$$\tilde{a}_1=(a_2,\ldots,a_V), \tilde{b}_1=(b_2,\ldots,b_V) \quad \text{(Eqn. 2)}$$

Likewise, for Information Processor 2 106(2), the second component of vectors a and b may be deleted to provide secured vectors $\tilde{a}_2$, $\tilde{b}_2$, respectively, where:

$$\tilde{a}_2=(a_1,a_3,\ldots,a_V), \tilde{b}_2=(b_1,b_3,\ldots,b_V) \quad \text{(Eqn. 3)}$$

and so forth for each processor of the collection of information processors. Note that one different sub-vector may be left out for each processor; accordingly, each sub-vector may be left out once and only once. Based on such extraction, V secured query terms may be generated, one for each processor of the collection of information processors. Likewise, each of the plurality of transformed terms may be secured to generate X*V plurality of secured terms, one for each processor. Accordingly, in some examples, the secured terms may be based on the number of Information Processor V in the collection of information processors.

In some examples, the secured query term and the secured representative terms (selected from the plurality of terms in a given dataset) may be provided to the given information processor. In some examples, a secured query term 1 such as $\tilde{a}_1$ may be provided to Information Processor 1 106(1), and a secured representative term such as $\tilde{b}_1$ may be provided to Information Processor 1 106(1). Likewise. Information Processor 2 106(2) may receive a secured query term with the second component extracted, and secured representative terms with the respective second components extracted. Accordingly, Information Processor 1 106(1) receives secured query term 1, and a plurality of secured representative terms with the respective first components extracted; Information Processor 2 106(2) receives secured query term 2, and a plurality of secured representative terms with the respective second components extracted; and Information Processor V 106(v) receives secured query term V, and a plurality of secured representative terms with the respective V-th components extracted.

In some examples, system 100 may evaluate, for each processor, a similarity score between the secured query term and each given secured representative term, the similarity score indicative of proximity of the given secured representative term to the secured query term, and based on shared data elements between the secured query term and the given secured representative term. For example, to evaluate a similarity score between a and b, a similarity score may be evaluated between pairs of sub-vectors $\tilde{a}_1, \tilde{b}_1, \tilde{a}_2, \tilde{b}_2, \ldots, \tilde{a}_V, \tilde{b}_V$, and so forth.

In some examples, the secured query term and each secured representative term may be a sub-vector of same length, and the similarity score is a ratio of a number of shared data elements between the secured query term and a secured representative term to the length. For example, if sub-vectors $\tilde{a}_1, \tilde{b}_1$ share m data elements, then the similarity score for the pair $\tilde{a}_1, \tilde{b}_1$ is $$\frac{m}{H - \frac{H}{V}}.$$

In some examples, $a=(a_1, a_2, \ldots, a_V)$, $b=(b_1, b_2, \ldots, b_V)$, may share M elements. A number of shared elements between $a_i$ and $b_j$ may be represented as $u_{i,j}$, where $1 \leq i,j \leq V$, and in matrix form, a matrix A may be utilized to represent these shared elements. For example, $$A = \begin{pmatrix} u_{11} & \cdots & u_{1V} \\ \vdots & \ddots & \vdots \\ u_{V1} & \cdots & u_{VV} \end{pmatrix} = (u_{ij})_{1 \leq i,j \leq V}. \quad \text{(Eqn. 4)}$$

Accordingly, $\Sigma_{1 \leq i,j \leq V} u_{i,j} = M$.

In some examples, an average similarity score may be evaluated by averaging the similarity scores between the secured query term and the secured representative term, the averaging performed over all the processors. For example, to evaluate the average similarity score between the vectors a and b, the similarity scores may be averaged between the pairs $\tilde{a}_1, \tilde{b}_1, \tilde{a}_2, \tilde{b}_2, \ldots, \tilde{a}_V, \tilde{b}_V$. Let $$\zeta = \frac{M}{H}$$

denote the similarity between a and b, and let $\zeta_i$ denote the similarity between $\tilde{a}_i$ and $\tilde{b}_i$. Then, $$\zeta_i = \frac{M - (u_{i1} + u_{i2} + \ldots + u_{iV}) - (u_{1i} + u_{2i} + \ldots + u_{Vi}) + u_{ii}}{H * \frac{V-1}{V}} \quad \text{(Eqn. 5)}$$

Based on Eqn. 1, the average similarity between the vectors a and b over V processors may be evaluated as:

$$\zeta = \sum_{i=1}^{V} \zeta_i / V = \frac{(V-2)*M + \sum_{i=1}^{V} u_{ii}}{(V-1)*H}, \quad \text{(Eqn. 6)}$$

with a range $$\left[\frac{V-2}{V-1} \zeta_o, \zeta\right]$$

corresponding to $\Sigma_{i=1}^{V} u_{ii} = 0$ and $\Sigma_{i=1}^{V} u_{ii} = M$.

In some examples, the average similarity score, for the given secured representative term, may have a hypergeometric distribution. When a and b are vectors of length H, then there are $H^2$ pairs between each data element in a and each data element in b. Since the total number of shared elements between a and b is M, there are M matches among the $H^2$ pairs. The sum of the diagonal terms $\Sigma_{i=1}^{V} u_{ii}$ in matrix A correspond to $(H/V)^2 * V$ pairs. The number of matches S out of the $(H/V)^2 * V$ pairs then follows a hypergeometric distribution give as:

$$Pr\left\{\sum_{i=1}^{V} u_{ii} = S\right\} = \frac{\binom{\left(\frac{H}{V}\right)^2 * V}{S} * \binom{\left(\frac{H}{V}\right)^2 * (V^2 - V)}{M - S}}{\binom{H^2}{M}}, \quad \text{(Eqn. 7)}$$

where S belongs to the set $\{0, 1, \ldots, M\}$. Once the distribution of $\Sigma_{i=1}^{V} u_{ii}$ is known to be hypergeometric, it follows that the distribution of the average similarity score $\zeta$ is also hypergeometric, since $$Pr\left\{\zeta = \frac{(V-2)*M + S}{(V-1)*H}\right\} = \quad \text{(Eqn. 8)}$$

$$Pr\left\{\sum_{i=1}^{V} u_{ii} = S\right\} = \frac{\binom{\left(\frac{H}{V}\right)^2 * V}{S} * \binom{\left(\frac{H}{V}\right)^2 * (V^2 - V)}{M - S}}{\binom{H^2}{M}},$$

where S belongs to the set $\{0, 1, \ldots, M\}$.

In some examples, the given data processor filters the candidate terms, without knowledge of the query term, by determining similarity scores between the secured query term and the plurality of secured terms, the determination based on the similarity scores (determined at the given information processor) between the secured query term and the secured representative terms. The main idea behind the candidate selection process is to estimate the similarity between the secured query term, denoted a, and all secured terms in the given data processor, Data Processor 1 110(1), by only knowing the similarity score between the query term and a small set of terms (e.g., secured representative terms) from the given data processor, Data Processor 1 110(1).

Accordingly, terms irrelevant to the retrieval task (e.g., objects with a low probability of being in the top-k) may be filtered out without actually comparing them with a; thus eliminating the need to send them from the given data processor, Data Processor 1 110(1), to the Information Processors. In other words, given a query term a from the query dataset, and terms $b_1, b_2, \ldots, b_X$ from the given data processor, Data Processor 1 110(1), the goal is to keep the top-k most similar objects out of the $b_X$ terms by comparing a with a small portion of terms from the given data processor, Data Processor 1 110(1). Note that when the query term a and a small set of representative terms from the given data processor, Data Processor 1 110(1) are compared, the terms may be randomly divided into V sub-vectors and each such sub-vector may be provided to the V processors separately. The similarity score may be determined as a number of common elements between the query term a and representative term b, and may be obtained as a sum of a number of common elements between a and a sub-vector of b for every processors.

More formally, a similarity distribution of the similarity scores between two terms a and b, given their similarity to a third term w, may be derived. For example, a may be the query term, b may be a term of the plurality of terms $b_1, b_2, \ldots, b_X$, and w may be a representative term from a duster in the given data processor, Data Processor 1 110(1). As described herein, in some examples, w may be a preferred term selected from the representative terms, the selection based on similarity to the query term a.

A key aspect of the secure comparison described herein is that based on such a similarity distribution, the secured query term may be compared to secured representative terms and/or the preferred term, and such secure comparisons may be utilized to securely compare the query term with all terms $b_2, \ldots, b_X$ in the given data processor, without having to share the query term with the given data processor. Accordingly, the given data processor may share only the secured representative terms with the collection of information processors.

Accordingly, in the secure information retrieval described herein, the given data processor shares only secured representative terms with the collection of information processors, and the query processor 102 only shares a secured query term with the collection of information processors. Accordingly, the given information processor, Information Processor 1 106(1), is not privy to the actual composition of the query term in the query processor 102, and the plurality of terms in a given dataset, Data Processor 1 110(1). Also, for example, the query processor 102 has no knowledge of the actual composition of the plurality of terms in a given dataset, Data Processor 1 110(1). Likewise, the given data processor, Data Processor 1 110(1), has no knowledge of the actual composition of the query term in the query processor 102. The given information processor computes similarity scores between the secured query term and the secured representative terms, and provides the determined similarity scores to the given data processor. The given data processor, in turn, utilizes the techniques disclosed herein, to determine similarity scores between the secured query term and the plurality of secured terms based on the similarity scores between the secured query term and the secured representative terms received from the given information processor.

As described herein, another advantage of such indirect determination of similarity scores is that if the query processor 102 requests additional candidate terms similar to a second query term, the same secured representative terms and/or the same preferred term may be utilized again to select the additional candidate terms.

As described herein, the similarity between two vectors with the same length may be defined as a ratio of a number of shared elements to the vectors' length, which is denoted by $\zeta$. Let M denote the common number of elements between two vectors, H the length of vectors, $\zeta_{a,w}$ and $\zeta_{b,w}$ denote the similarity scores between a and w, and b and w, respectively. Then the overlap may be determined as $|a \cap w| = M_{a,w} = H \cdot \zeta_{a,w}$ and $|b \cap w| = M_{b,w} = H \cdot \zeta_{b,w}$. A similarity distribution for $\zeta_{a,b}$ may then be derived as $M_{a,b} = H \cdot \zeta_{a,b}$.

To derive the similarity distribution $M_{a,b}$, the overlap of terms a and b may be analyzed. For example, $$a \cap b = \{(a \cap b) \cap (a \cap w)\} \cup \{(a \cap b) \cap (a \setminus w)\} \quad \text{(Eqn. 9)}$$

where $a \setminus w$ is a set difference between a and w. For simplicity of notation, let $q_1 = \{(a \cap b) \cap (a \cap w)\}$, and $q_2 = \{(a \cap b) \cap (a \setminus w)\}$ denote two disjoint component sets for $a \cap b$. Then, $M_{a,b} = |a \cap b| = |q_1| + |q_2|$. In some examples, $M_{a,w} \geq M_{b,w}$.

In some examples, the similarity distribution may have a hypergeometric distribution. For example, $q_1$ may be constructed by sampling elements in $w \cap b$ without replacement from the set w. The elements in w may be classified into two mutually exclusive sets $w \cap a$ and $w \setminus a$. Out of all drawn elements constructing $w \cap b$, elements sampled from $w \cap a$ will construct the set $q_1$. Accordingly, the similarity distribution for $|q_1|$ may be hypergeometric, with:

$$Pr\{|q_1| = z_1\} = \frac{\binom{M_{w,a}}{z_1} * \binom{H - M_{w,a}}{M_{w,b} - z_1}}{\binom{H}{M_{w,b}}}, \quad \text{(Eqn. 10)}$$

where $\max\{M_{w,a} + M_{w,b} - H, 0\} \leq z_1 \leq M_{w,b}$.

In some examples, $q_2$ may be represented as $(a \cap b) \setminus w$, which may be constructed by sampling elements in $a \setminus w$ from $\{1, 2, \ldots, U\} \setminus w$. Such sampling elements are selected from $a \setminus w$ rather than $b \setminus w$ may be based, in some examples, on an assumption that $$|a \setminus w| = |a| - |a \cap w| \leq |b| - |b \cap w| = |b \setminus w|. \quad \text{(Eqn. 11)}$$

In some examples, the elements in $\{1, 2, \ldots, U\} \setminus w$ may be classified into two mutually exclusive sets $b \setminus w$ and $\{1, 2, \ldots, U\} \setminus (b \cup w)$. Out of all drawn elements constructing $a \setminus w$, elements sampled from $b \setminus w$ may construct the set $q_2$. Accordingly, the similarity distribution for $|q_2|$ may be hypergeometric, with:

$$Pr\{|q_2| = z_2\} = \frac{\binom{H - M_{w,b}}{z_2} * \binom{U - (2 * H - M_{w,b})}{H - M_{w,a} - z_2}}{\binom{U - H}{H - M_{w,a}}}, \quad \text{(Eqn. 12)}$$

where $0 \leq z_2 \leq H - M_{w,a}$.

In some examples, the distribution of $M_{a,b} = |a \cap b| = |q_1| + |q_2|$ may be determined based on known and independent distributions of $|q_1|$ and $|q_2|$. For example, $$Pr\{M_{a,b} = z\} = \sum_{\substack{\max\{M_{w,a} + M_{w,b} - H, 0\} \leq z_1 \leq M_{w,b} \\ 0 \leq z - z_1 \leq H - M_{w,a}}} Pr\{|q_1| = z_1, |q_2| = z - z_1\} = \quad \text{(Eqn. 13)}$$

-continued $$\sum_{\substack{max(M_{w,a}+M_{w,b}-H,0)\leq z_1 \leq M_{w,b} \\ 0\leq z-z_1 \leq H-M_{w,a}}} Pr\{|q_1|=z_1\} Pr\{|q_2|=z-z_1\}$$

Accordingly, the range for $M_{a,b}$ may be determined as:

$$\max\{M_{w,a}+M_{w,b}-H,0\}\leq z\leq H-(M_{w,a}+M_{w,b}),\quad \text{(Eqn. 14)}$$

based on an assumption that $M_{a,w}\geq M_{b,w}$. In some examples, such an assumption may be removed, and the range for $M_{a,b}$ may be determined as:

$$\max\{M_{w,a}+M_{w,b}-H,0\}\leq z\leq H-|M_{w,a}+M_{w,b}|,\quad \text{(Eqn. 15)}$$

In some examples, a range for $\zeta_{a,b}$ may then be derived as:

$$\max\{\zeta_{w,a}+\zeta_{w,b}-1,0\}\leq \zeta_{a,b}\leq 1-|\zeta_{w,a}-\zeta_{w,b}|,\quad \text{(Eqn. 16)}$$

In some examples, once the secured representative terms denoted as $r_1, r_2, \ldots, r_G$, where $1\leq G\leq X$ are determined, similarity scores $\zeta_{a,r_1}, \zeta_{a,r_2}, \ldots, \zeta_{a,r_G}$ between the secured query term a and the G secured representative terms may be determined. In some examples, a preferred term b* may be selected as a term most similar to the secured query term a. For example, the preferred term b* may be selected as:

$$b^*=\operatorname{argmax}_i \zeta_{a,r_i}, 1\leq i\leq G \quad \text{(Eqn. 17)}$$

In some examples, the plurality of terms may be compared to the secured query term a by comparing the plurality of secured terms with the preferred term b*. For example, for each $1\leq j\leq X$, given the two similarity scores $\zeta_{a,b^*}$ and $\zeta_{b^*,b_j}$, the similarity distribution for $\zeta_{a,b_j}$ may be determined as described herein.

In some examples, the filtering the candidate terms may be based on a confidence threshold for similarity distributions between the secured query term and the plurality of secured terms. For example, a lower one-sided 90% confidence bound for $\zeta_{a,b_j}$ (denoted by $C_{j,0.90}$) may be determined. As in this example, the lower one-sided 90% confidence bound may be indicative of 90% confidence that the value for $\zeta_{a,b_j}$ is above $C_{j,0.90}$.

In some examples, given such confidence bounds $C_{j,0.90}$, where $1\leq j\leq X$, a percentile of values for the confidence bounds may be determined, and the candidate terms may be filtered based on the percentile of values. For example, a 100*(1−α) % percentile may be determined for the confidence bounds, and the percentile may be denoted as $\eta_{a,0.90}$. Then such percentile $\eta_{a,0.90}$ may be utilized as a similarity score threshold to eliminate irrelevant terms, and selected the candidate terms.

For example, given the two similarity scores $\zeta_{a,b^*}$ and $\zeta_{b^*,b_j}$, a range of $\zeta_{a,b_j}$ may be determined as described herein, with an upper bound:

$$ub\zeta_{a,b_j}=1-|\zeta_{a,b^*}-\zeta_{b^*,b_j}| \quad \text{(Eqn. 18)}$$

Accordingly, a determination to keep or eliminate a term $b_j$ may be made by comparing $\eta_{a,0.90}$ with $ub\ \zeta_{a,b_j}$. If, for example, $ub\ \zeta_{a,b_j} < \eta_{a,0.90}$, then the term $b_j$ may be discarded. Otherwise, the term $b_j$ may be selected as a candidate term to be provided to the query processor 102 via the collection of information processors.

In some examples, the similarity scores $\zeta_{a,b_j}$ for the selected candidate terms may be provided to the collection of information processors, and the collection of information processors may provide, to the query processor 102, based on such similarity scores, at least one term identifier associated with a candidate term. For example, Information Processor 1 106(1) may retrieve at least one term identifier from the given data processor, Data Processor 1 110(1), where the term identifier identifies a selected candidate term.

In some examples, system 100 may include a ranker (not illustrated in FIG. 1) to rank, for each processor of the collection of information processors, the plurality of terms based on respective similarity scores. For example, for Information Processor 1 106(1), the candidate terms 118 may be ranked based on the respective similarity scores. In some examples, each processor of the collection of information processors may provide, to the query processor 102, a plurality of ranked term identifiers, and each ranked term identifier identifying a ranked candidate term. For example. Information Processor 1 106(1) may provide to the query processor 102, the top k similarity scores between the sub-vector $\tilde{a}_1$ associated with the query term and the plurality of sub-vectors associated with the plurality of terms. In some examples, unique term identifiers associated with the plurality of terms, corresponding to the top k similarity scores, may be provided to the query processor 102. Likewise, Information Processor 2 106(2), . . . , Information Processor V 106(v) may provide unique term identifiers to the query processor 102, based on the evaluated similarity scores at each processor.

In some examples, the collection of information processors may provide to the query processor 102, an aggregate ranking of the plurality of ranked term identifiers, aggregated over all processors of the collection of information processors. For example, the collection of information processors may pool the top k similarity scores from each processor, and then select the top k similarity scores over all processors. In some examples, such aggregate ranking may be performed by an entity that manages query processor 102. For example, the collection of information processors may forward the top k similarity scores from each processor to a first hospital managing the query processor 102, and the first hospital may then evaluate an aggregate ranking over all processors.

In some examples, the query processor 102 may further request secure retrieval of additional candidate terms similar to a second query term. In some examples, the secured representative terms and/or the preferred term previously identified, may be utilized to select the additional candidate terms. For example, as described herein, the given information processor may determine additional similarity scores between a second secured query term and the secured representative terms. For example, a secured second query term may be generated by the query processor 102 and provided to the given information processor. The given information processor may then determine additional similarity scores between the secured second query term and the previously identified secured representative terms. In some examples, a second preferred term, of the representative terms, may be selected based on such additional similarity scores, where the second preferred term may be most similar to the second secured query term. As a result, no additional selection of representative terms is required at the given data processor. In some examples, the given data processor may filter the additional candidate terms without any knowledge of the second query term or the second secured query term, by determining additional similarity scores between the second secured query term and the plurality of terms, the determination based on the additional similarity scores between the second secured query term and the secured representative terms.

As described herein, comparison of the query term with representative terms at the given information processor is advantageous for datasets with a large volume of terms. In some examples, Data Processor 1 110(1) may include a very large number of terms and may provide each processor with secured representative terms for comparison with the query term. However, Data Processor 2 110(2) may comprise a relatively small number of terms, and Data Processor 2 110(2) may transform and secure all its terms and provide such secured terms to each processor. Accordingly, each processor may compare the query term to a few representative terms from Data Processor 1 110(1) and all the terms from Data Processor 2 110(2).

Although system 100 has been described with reference to the given information processor, Information Processor 1 106(1), and the given data processor, Data Processor 1 110(1), similar operations may be performed by other information processors in the collection of information processors (e.g., Information Processor 2 106(2), . . . , Information Processor V 106(v)) and by the other Data Processors in the plurality of data processors (e.g., Data Processor 2 110(2), Dataset 3 110(3), . . . , Data Processor Y 110(y)).

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated visualization function.

For example, the information processors, such as Information Processor 1 106(1) may be a combination of hardware and programming for performing a designated function. For example, the Information Processor 1 106(1) may include programming to receive the query term and the representative terms, and determine similarity scores for the query term and the representative terms. The Information Processor 1 106(1) may include hardware to physically store the similarity scores, and processors to physically process the received terms and determined similarity scores. Also, for example, information Processor 1 106(1) may include software programming to dynamically interact with the other components of system 100.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, the query processor 102 and the plurality of data processors (e.g., Data Processor 2 110(2), Dataset 3 110(3), . . . , Data Processor Y 110(y)) may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
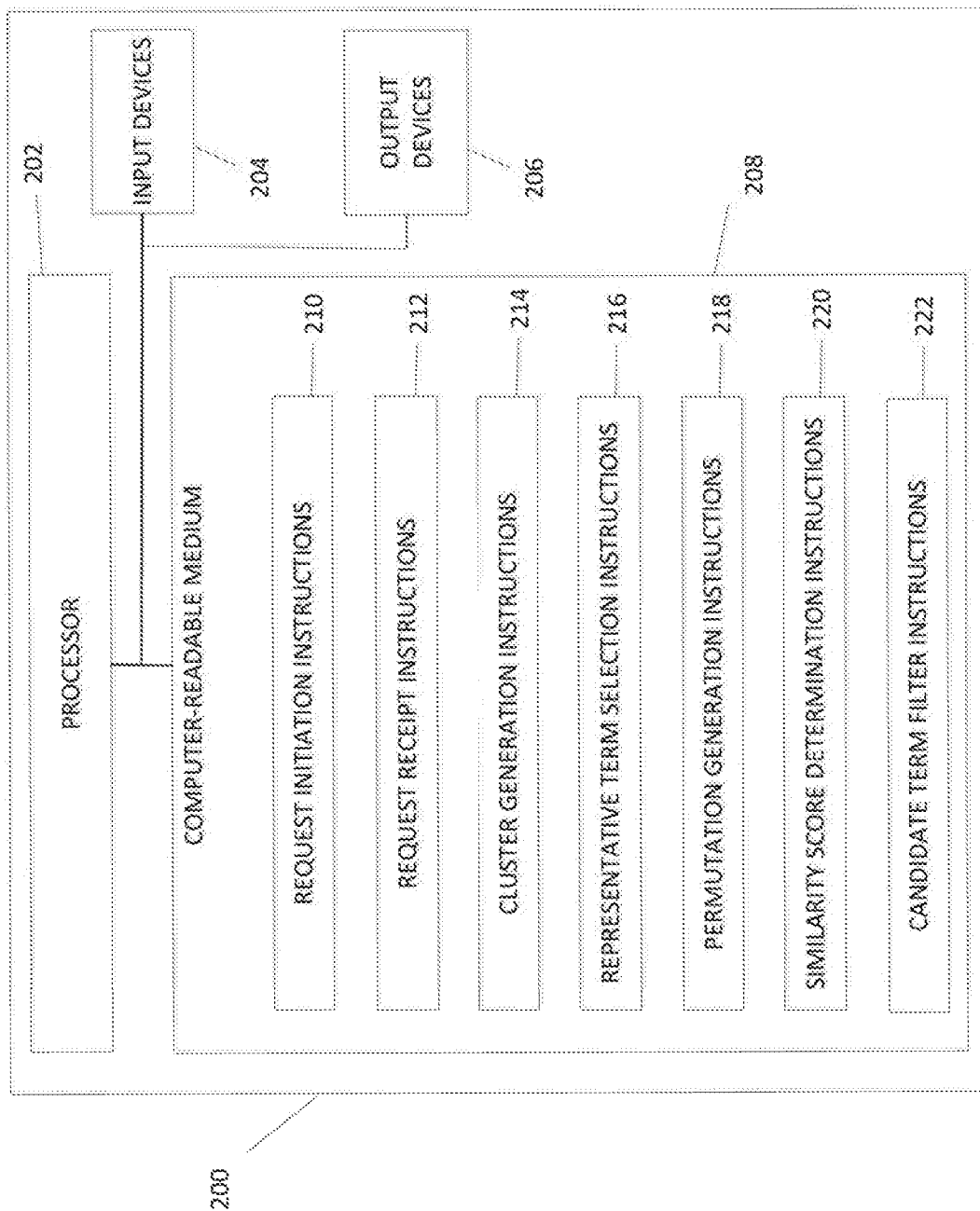
FIG. 2 is a block diagram illustrating one example of a computer readable medium for secure multi-party information retrieval.

FIG. 2 is a block diagram illustrating one example of a computer readable medium for secure multi-party information retrieval. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes request initiation instructions 210 to initiate a request, from a query processor, for secure retrieval of candidate terms similar to a query term in a query dataset. In some examples, the request initiation instructions 210 may include a hash universe size U, a hash count, and a number of terms to be retrieved.

Computer readable medium 208 includes request receipt instructions 212 to receive the request at a given information processor of a collection of information processors.

Computer readable medium 208 includes cluster generation instructions 214 to generate, at a given data processor of a plurality of data processors, clusters of a plurality of terms in a given dataset, based on similarity scores for pairs of terms.

Computer readable medium 208 includes representative term selection instructions 216 to select a representative term from each cluster.

Computer readable medium 208 includes permutation generation instructions 218 to generate, at the given information processor, a random permutation based on the request.

Computer readable medium 208 includes similarity score determination instructions 220 to determine similarity scores between a secured query term received from the query processor and secured representative terms received from the given data processor, the secured terms based on the random permutation.

Computer readable medium 208 includes candidate term filter instructions 222 to filter, at the given data processor and without knowledge of the secured query term, the candidate terms of the plurality of terms based on the determined similarity scores.

Input devices 204 include a keyboard, mouse, data ports, and/or other suitable devices for inputting information into processing system 200. In some examples, input devices 204, such as a computing device, are used by the interaction processor to receive a query term. Output devices 206 include a monitor, speakers, data ports, and/or other suitable devices for outputting information from processing system 200. In some examples, output devices 206 are used to provide the candidate terms.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include Processor 202 for executing those instructions. Thus, computer readable medium 208 may store program instructions that, when executed by Processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
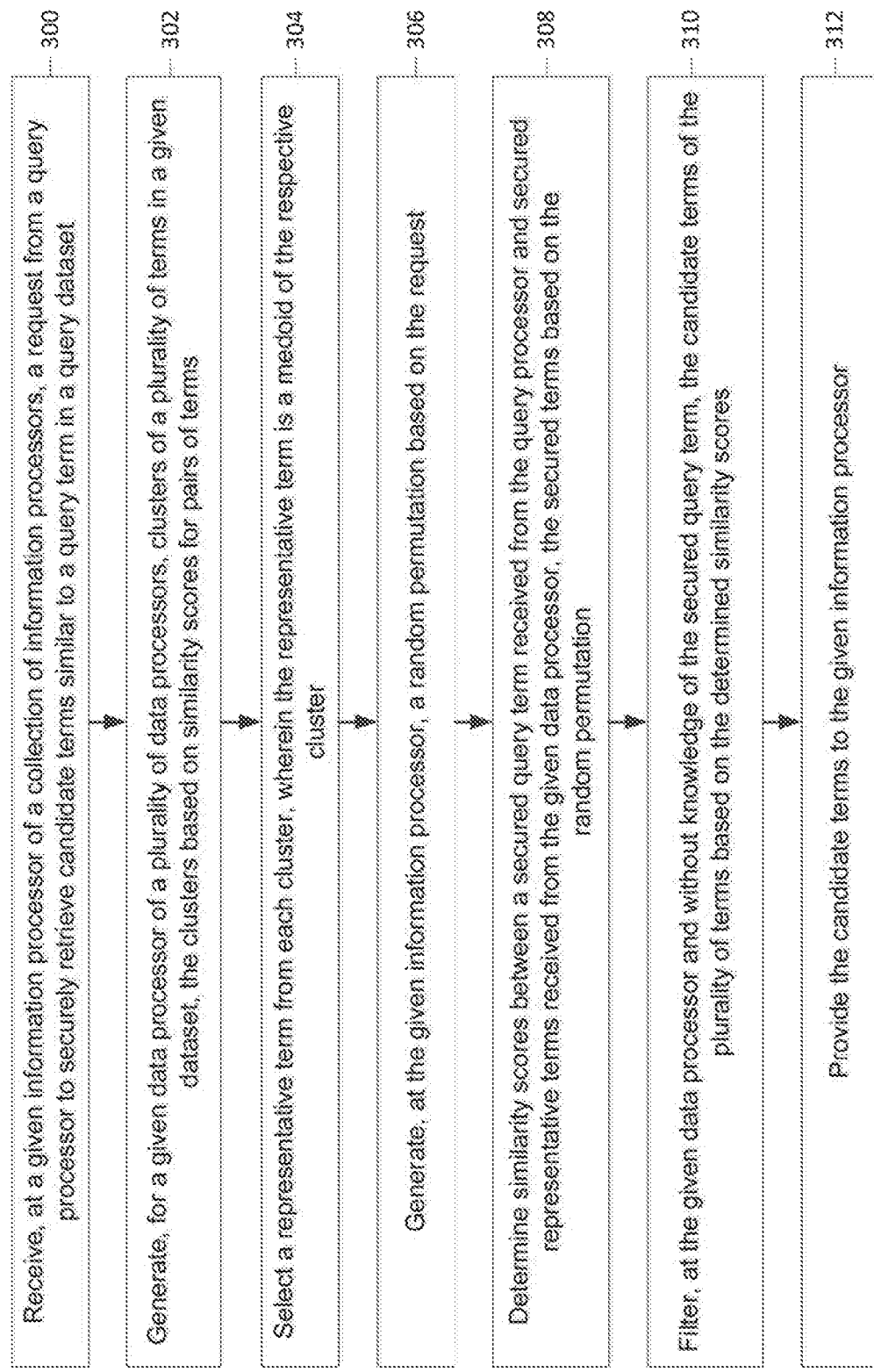
FIG. 3 is a flow diagram illustrating one example of a method for secure multi-party information retrieval.

FIG. 3 is a flow diagram illustrating one example of a method for secure multi-party information retrieval.

At 300, a request may be received, at a given information processor of a collection of information processors, from a query processor to securely retrieve candidate terms similar to a query term in a query dataset. In some examples, the request includes a hash universe size U, a hash count, and a number of terms to be retrieved.

At 302, for a given data processor of a plurality of data processors, dusters of a plurality of terms in a given dataset may be generated, the clusters based on similarity scores for pairs of terms.

At 304, a representative term may be selected from each cluster, where the representative term is a medoid of the respective cluster.

At 306, based on the request, a random permutation may be generated at the given information processor.

At 308, similarity scores may be determined between a secured query term received from the query processor and secured representative terms received from the given data processor, where the secured terms are based on the random permutation.

At 310, the candidate terms of the plurality of terms may be filtered at the given data processor and without knowledge of the secured query term, the filtering based on the determined similarity scores.

At 312, the candidate terms may be provided to the given information processor.

In some examples, the method may further include ranking the candidate terms for the given information processor based on the similarity scores. In some examples, the method may further include associating each ranked term identifier with a candidate term, and providing, to the query processor, a plurality of ranked term identifiers.

In some examples, the method may further include selecting, by the query processor, top-k term identifiers from the plurality of ranked term identifiers.

In some examples, the collection of information processors may provide to the query processor, an aggregate ranking of the plurality of ranked term identifiers, aggregated over all processors of the collection of information processors.

In some examples, the filtering the candidate terms may be based on a confidence threshold for similarity distributions between the secured query term and the plurality of secured terms.

Examples of the disclosure provide a generalized system for secure multi-party information retrieval. The generalized system provides a protocol to compute the similarity between objects from multiple entities in a secure and anonymized manner. The filtering algorithm described herein reduces the number of terms from a dataset to a smaller representative set, thereby making it efficient to anonymously compare datasets with a large number of terms. As described herein, the proposed system is based on the principles of the hypergeometric distribution, orthogonal transform based hashing, and distributed retrieval. The systems and methods disclosed herein enable multiple entities to compute the similarity between their respective sets of objects without information leakage (i.e., sharing the information and/or features corresponding to the objects).

Although the examples are described with a query term in a query dataset, the techniques disclosed herein may be applied to more than one term in the query dataset. For example, the query dataset may include a plurality of query terms, and top k terms may be identified that are similar to the plurality of query terms. The proposed system is secure because the collection of information processors perform the actual retrieval process (determining size of overlapping data elements) and report only the top-k similarity scores (overlap size) and unique identifiers to the query processor. Accordingly, the query processor does not determine the similarity scores. Generation of secured terms based on the transformed data terms ensures that each of the collection of information processors does not have complete data; so information may not be leaked by any of the information processors. Additionally, the hash transformation ensures that the collection of information processors only have the hashes. Accordingly, the information processors are unable to regenerate the original data terms in the datasets (i.e., hash-to-data is not possible). The plurality of Information processors compute the hash set overlap (no original object data is involved). The orthogonal transform based hashing is a probabilistic approach with a many-to-one transform. If hash parameters are chosen carefully (e.g. $H \ll N$, $N \ll U$, random permutations, and so forth) then there is no linear mapping between data elements in the original data term and the secured (hashed) data terms. Accordingly, in a worst case scenario where all the information processors of the collection of information processors are non-trusted and leak the hashes to the query processor, then the query processor is still unable to regenerate the original object information in the data processors.

Although specific examples have been illustrated and described herein, especially as related to numerical data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a query processor to request secure retrieval of candidate terms similar to a query term in a query dataset, the query processor comprising at least one hardware component;
a collection of information processors, wherein a given information processor is to receive the request and generate a random permutation based on the request;
a plurality of data processors, wherein a given data processor is to generate clusters of a plurality of terms in a given dataset, based on similarity scores for pairs of terms, and is to select a representative term from each cluster; and wherein:
the given information processor is to determine similarity scores between a secured query term received from the query processor and secured representative terms received from the given data processor, the secured representative terms based on the random permutation, and
the given data processor is to filter, without knowledge of the query term, the candidate terms of the plurality of terms based on the determined similarity scores.

2. The system of claim 1, wherein the given data processor generates the secured representative terms by applying an orthogonal transform to each term, and by truncating a portion of the transformed term, the truncated portion being based on the given information processor.

3. The system of claim 1, wherein the given information processor is to:
associate each candidate term with a ranked term identifier, wherein the ranked term identifier is based on the determined similarity scores; and
provide, to the query processor, a plurality of ranked term identifiers.

4. The system of claim 3, wherein the collection of information processors is to provide to the query processor, an aggregate ranking of the plurality of ranked term identifiers from each processor, aggregated over all processors of the collection of information processors.

5. The system of claim 3, wherein the query processor is to select top-k term identifiers from the plurality of ranked term identifiers.

6. The system of claim 1, wherein the given data processor is to filter the candidate terms based on a confidence threshold for similarity distributions between the secured query term and a plurality of secured representative terms.

7. The system of claim 6, wherein the similarity distributions have a hypergeometric distribution.

8. The system of claim 1, wherein:
the query processor is to further request secure retrieval of additional candidate terms similar to a second query term;
the given information processor is to determine additional similarity scores between a secured second query term and the secured representative terms; and
the given data processor is to filter, without knowledge of the second query term, the additional candidate terms of the plurality of terms based on the determined additional similarity scores.

9. A method for secure multi-party information retrieval, the method comprising:
receiving, at a given information processor of a collection of information processors, a request from a query processor to securely retrieve candidate terms similar to a query term in a query dataset;
generating, for a given data processor of a plurality of data processors, clusters of a plurality of terms in a given dataset, the clusters based on similarity scores for pairs of terms;
selecting a representative term from each cluster, wherein the representative term is a medoid of the respective cluster;
generating, at the given information processor, a random permutation based on the request;
determining, at the given information processor, similarity scores between a secured query term received from the query processor and secured representative terms received from the given data processor, the secured representative terms based on the random permutation;
filtering, at the given data processor and without knowledge of the secured query term, the candidate terms of the plurality of terms based on the determined similarity scores; and
providing the candidate terms to the given information processor.

10. The method of claim 9, further comprising ranking, for the given information processor, the candidate terms based on the similarity scores.

11. The method of claim 10, further comprising:
associating each ranked term identifier with a candidate term; and
providing, to the query processor, a plurality of ranked term identifiers.

12. The method of claim 11, further comprising selecting, by the query processor, top-k term identifiers from the plurality of ranked term identifiers.

13. The method of claim 11, wherein the collection of information processors provides to the query processor, an aggregate ranking of the plurality of ranked term identifiers, aggregated over all processors of the collection of information processors.

14. The method of claim 9, wherein the filtering the candidate terms is based on a confidence threshold for similarity distributions between the secured query term and the secured representative terms.

15. A non-transitory computer readable medium comprising executable instructions to:
initiate a request, from a query processor, for secure retrieval of candidate terms similar to a query term in a query dataset;
receive the request at a given information processor of a collection of information processors;
generate, at a given data processor of a plurality of data processors, clusters of a plurality of terms in a given dataset, based on similarity scores for pairs of terms;
select a representative term from each cluster;
generate, at the given information processor, a random permutation based on the request;
determine, at the given information processor, similarity scores between a secured query term received from the query processor and secured representative terms received from the given data processor, the secured representative terms based on the random permutation; and filter, at the given data processor and without knowledge of the secured query term, the candidate terms of the plurality of terms based on the determined similarity scores.

16. The non-transitory computer readable medium of claim 15, comprising executable instructions to:
generate, by the given data processor, the secured representative terms by applying an orthogonal transform to each term, and by truncating a portion of the transformed term, the truncated portion being based on the given information processor.

17. The non-transitory computer readable medium of claim 15, comprising executable instructions to:
associate, by the given information processor, each candidate term with a ranked term identifier, wherein the ranked term identifier is based on the determined similarity scores; and
provide, by the given information processor, a plurality of ranked term identifiers to the query processor.

18. The non-transitory computer readable medium of claim 17, comprising executable instructions to:
wherein the collection of information processors is to provide to the query processor, an aggregate ranking of the plurality of ranked term identifiers from each processor, aggregated over all processors of the collection of information processors.

19. The non-transitory computer readable medium of claim 17, comprising executable instructions to:
select, by the query processor, top-k term identifiers from the plurality of ranked term identifiers.

20. The non-transitory computer readable medium of claim 15, comprising executable instructions to:
filter, by the given data processor, the candidate terms based on a confidence threshold for similarity distributions between the secured query term and a plurality of secured representative terms.

* * * * *